Dec. 23, 1958  C. J. GLOWZINSKI  2,865,123
LICENSE PLATE FRAME AND HOLDER
Filed Oct. 25, 1954  2 Sheets-Sheet 1
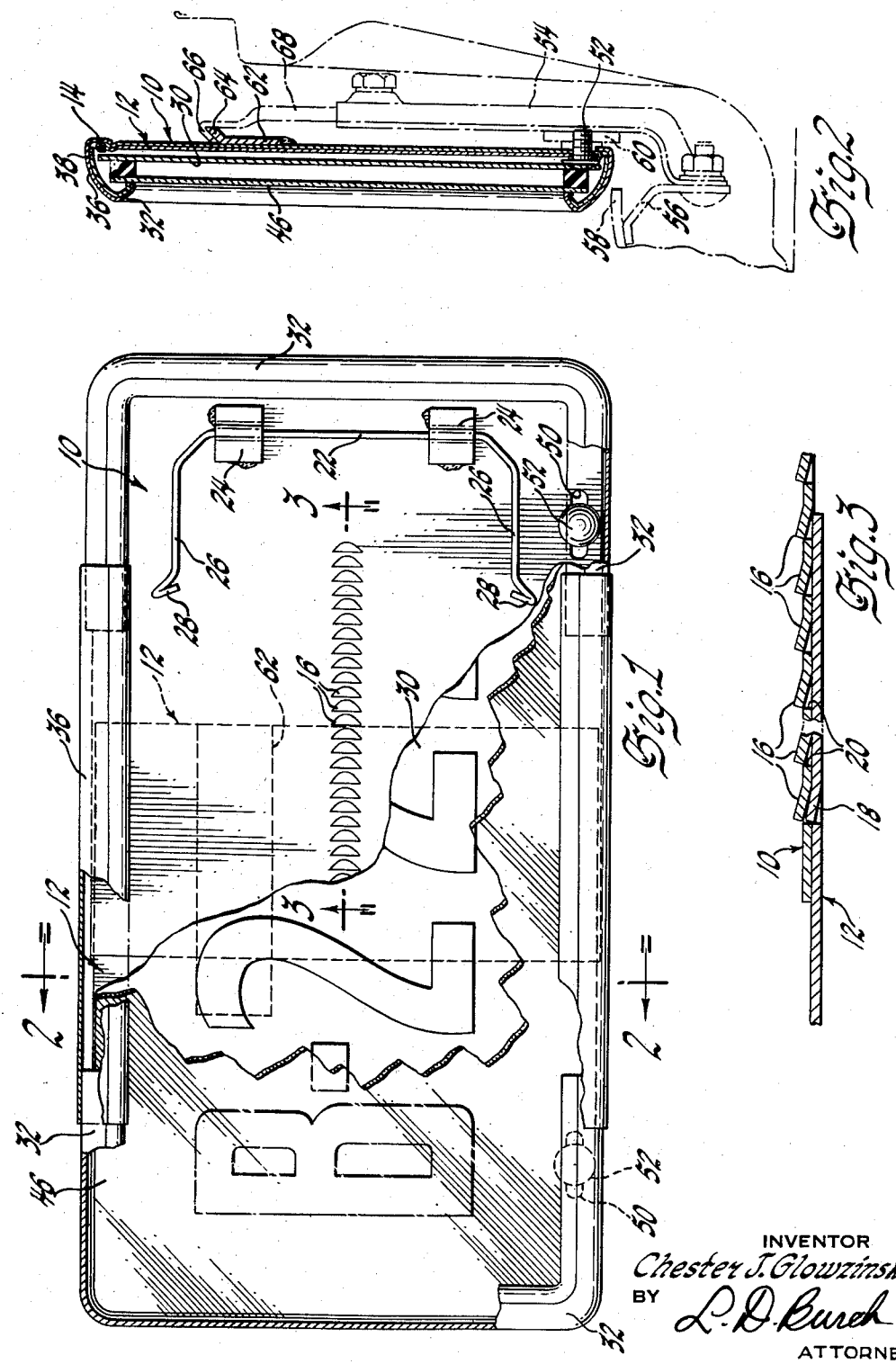
INVENTOR
Chester J. Glowzinski
BY
L. D. Burch
ATTORNEY Dec. 23, 1958  C. J. GLOWZINSKI  2,865,123
LICENSE PLATE FRAME AND HOLDER
Filed Oct. 25, 1954  2 Sheets-Sheet 2
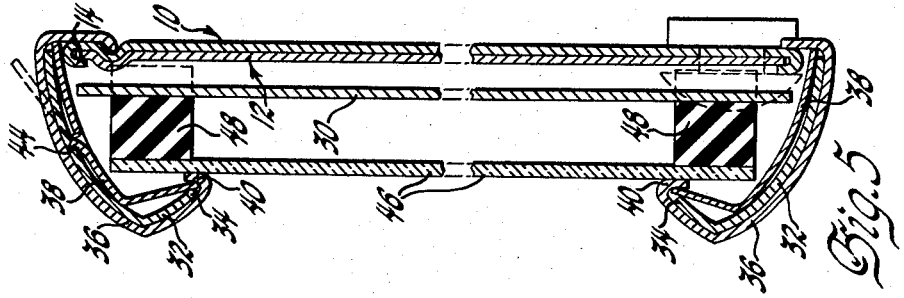
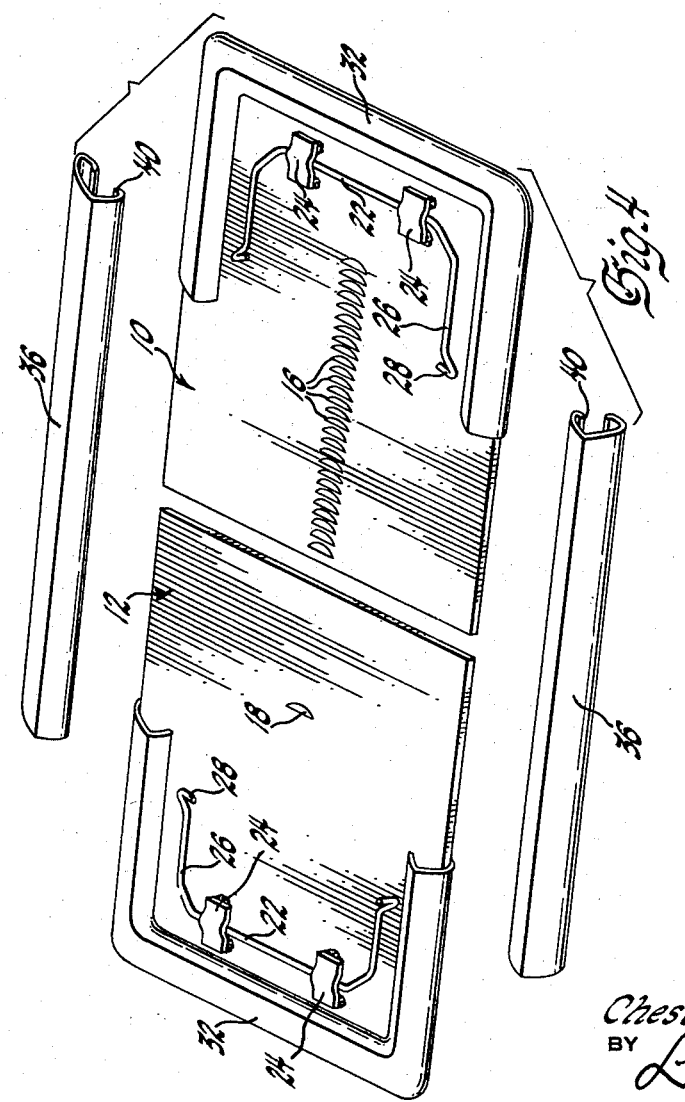
INVENTOR
Chester J. Glowzinski
BY L. D. Burch
ATTORNEY United States Patent Office 2,865,123
Patented Dec. 23, 1958

2,865,123

LICENSE PLATE FRAME AND HOLDER

Chester J. Glowzinski, Dearborn, Mich., assignor to General Motors Corporation, Detroit, Mich., a corporation of Delaware Application October 25, 1954, Serial No. 464,224

1 Claim. (Cl. 40—125)

This invention relates to license plate frames and holders generally and more particularly to adjustable license plate holders for receiving any size license plate and for protecting such license plates from inclement weather.

Most license plate framing members are purely decorative and generally merely include several chrome plated telescoping members which are adapted to encompass the edges of a license plate. Such framing members provide no protection for a license plate from adverse weather conditions and are dependent upon separate means of mounting the license plate. Vehicle owners generally find that a framing member of this type is usable only about one year. Because license plates are required to be mounted near the vehicle bumpers, they are inclined to be damaged and to receive the worst for wear. The license plates in turn, which are usually renewed yearly are not made for long life and rust readily. It is not uncommon to find it advisable to discard one's ornamental license plate framing member with each year's license plate.

It is now proposed to provide a license plate frame and holder which is not only decorative, but is functional as well. It is proposed to provide a license plate holder including a pair of backing plates having chrome plated or otherwise decoratively finished molding about the edges thereof. Each plate forms part of the holder and each is adjustable with respect to the other to accommodate license plates of different sizes. Telescoping intermediate molding members are adapted to be received by the molding members of each backing plate to form a decorative border within which the license plate is to be mounted. Means are provided to hold the backing plates and the molding members in their adjusted positions. It is further proposed to provide means for removably mounting a license plate to the backing plates and for centering the plate thereon. It is still further proposed to provide a transparent cover member which may be received within the license plate frame and over the license plate to protect the license plate from inclement weather conditions and other mishap while still assuring the visibility thereof.

The proposed license plate frame and holder is readily manufactured, includes a minimum number of separate parts, is easy to assemble, is highly decorative, and above all assures protection of license plates against most foreseeable damage.

In the drawings:

Figure 1 is a front view of the proposed license plate frame and holder showing a license plate mounted therein and having parts broken away for greater clarification of the assembly thereof.

Figure 2 is a cross-sectional side view of the proposed license plate frame and holder taken in the plane of line 2—2 of Fig. 1 as viewed in the direction of arrows thereon and which includes acceptable means, shown in phantom, for mounting the frame.

Figure 3 is a cross-sectional view of the means employed to retain the backing plates in an adjusted position as seen in the plane of line 3—3 of Fig. 1 looking in the direction of the arrows thereon.

Figure 4 is an exploded view of certain parts of the proposed license plate frame and holder.

Figure 5 is an enlarged cross-sectional side view of the assembled license plate frame and holder substantially as shown in Fig. 2.

The license plate frame and holder proposed includes a pair of backing plates 10 and 12. The upper and lower edges of one of the backing plates 10 is bent over as at 14 to receive the edges of the other plate 12. The backing plates are adapted to be held together in this manner and to be longitudinally adjustable with respect to each other. Such an adjustable arrangement is advisable to enable the proposed holder to accommodate license plates of different sizes. The overturned edges 14 are not shown in Figure 4 for reasons of drawing simplification.

As is shown in Figure 3, a plurality of tabs 16 are struck from one backing plate 10 to form a ratchet-like surface. A single tab 18 is struck from the other backing plate 12 which will engage the shoulders 20 under the tabs 16 to limit and hold the backing plates in any selected adjusted position. The plates 10 and 12 may be flexed to adjust the plates in a direction opposed to the ratchet stop means if desired.

License plate mounting means are secured to the face of each backing plate 10 and 12 near the outer ends of the plates and include a generally U-shaped wire element with a vertical base portion 22 secured by brackets 24 to the plates and which has horizontal resilient arms 26 extended outwardly. The ends of the arms 26 are bent over as at 28 to form a hook adapted to receive an edge of the license plate 30. The disposition of the bent over ends or hooks 28 of the arms 26 provides adequate retention of the license plate to the backing plate assembly.

Secured to each backing plate 10 and 12 are channel members 32 which are disposed about the edges of the plates to form an ornamental border. The forward edges 34 of the channel members are spaced from the front of the backing plates as shown in Figure 5. Intermediate channel members 36 are telescoped over the adjacently disposed ends of the channel members 32 of the respective backing plates 10 and 12. Such arrangement provides additional means holding the backing plates together and provides a contiguous ornamental edging or frame about the assembled backing plates.

Spring clips 38 disposed within the channel members 32 assist in holding the telescoped members 32 and 36 together. The leading edges of the intermediate channel members 36 are bent over as at 40 and engage the end of each clip 38 placing it under resilient compression. A sharp tab 44 struck in each clip 38 bites into the channel member 32, within which it is disposed, and urges the channel member 32 to more firmly engage the channel member 36 telescoped thereover. The unflexed shape of the clips 38 is shown in phantom in Figure 5.

A transparent cover plate 46 backed by a spacer gasket 48 is disposed over the license plate 30. The transparent plate 46 is engaged by the forward edges 34 and 40 of channel members 32 and 36 respectively and is disposed behind such edges. The cover plate 46 being transparent assures visibility of the license plate 30 while the plate itself provides protection for the license plate against inclement weather conditions.

The backing plates 10 and 12 are provided with elongated slots 50 through which bolts or other fastening means 52 may be extended for use in mounting the license plate frame and holder to a selected structure. The slots 50 are disposed near the lower edges of the backing plates so that the fastening means 52 are obscured by the channel members 32 disposed thereover. Any means may be employed to fasten the license plate frame and holder to a vehicle. One of several acceptable means is shown in phantom in Figure 2. A support member 54 is secured to a brace 56 attached to a bumper member 58, part of which is shown. The support member 54 includes a crossarm 60 to which fastening means 52 are secured. To provide greater stability to the mounted license plate frame and holder an elongated strap 62 is secured to the back of backing plate 10. The strap 62 is bent out from the backing plate as at 64 and is adapted to be engaged by the hooked end 66 of an adjustable arm 68 of support member 54.

I claim:

A license plate holder comprising only one pair of overlapped lengthwise adjustable backing plates, the first of said backing plates having overturned upper and lower edges forming U-shaped guiding means for receiving straight upper and lower edges of the second backing plate, lengthwise extending ratchet means formed integrally from the faces of said backing plates to enable lengthwise adjustment of said plates, said ratchet means including a plurality of tabs struck from one of said backing plates forming a ratchet-like surface with stop shoulders and at least one tab struck from the other of said backing plates engaging a stop shoulder of said ratchet-like surface, license plate mounting means secured to the front face of each of said backing plates, each of said mounting means including a generally U-shaped wire element having a vertical base portion and substantially horizontal resilient arm portions, said base portion being secured to the front face of the associated backing plate near the end thereof, said resilient arm portions terminating in hook-shaped ends for receiving and holding the upper and lower edge of the license plate, respectively.

References Cited in the file of this patent

UNITED STATES PATENTS

| | | |
|---|---|---|
| 961,267 | Thompson | June 14, 1910 |
| 1,375,875 | Wallace | Apr. 26, 1921 |
| 1,587,952 | Hartman | June 8, 1926 |
| 1,771,039 | Hedglon | July 22, 1930 |
| 1,879,906 | Linstrom | Sept. 27, 1932 |
| 1,886,352 | Nickerson | Nov. 1, 1932 |
| 2,194,106 | Wiley | Mar. 19, 1940 |
| 2,396,757 | Storm et al. | Mar. 19, 1946 |